March 22, 1966        H. F. MALONE        3,242,292
MOTOR PROTECTOR HAVING SUB-ASSEMBLED HEATER AND ACTUATOR
Filed April 3, 1963        2 Sheets-Sheet 1
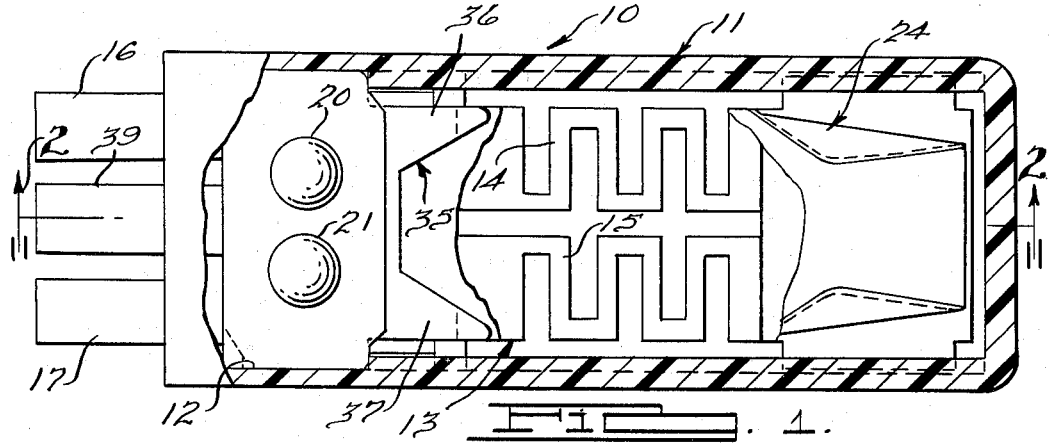
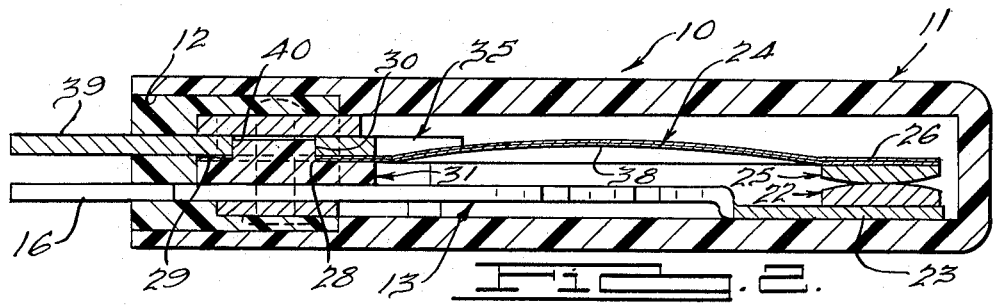
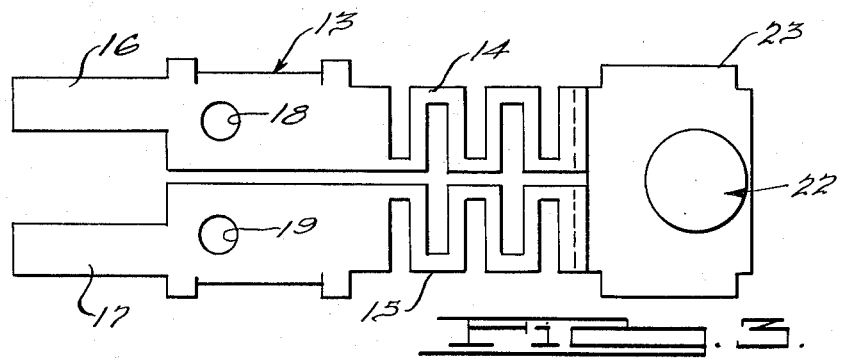
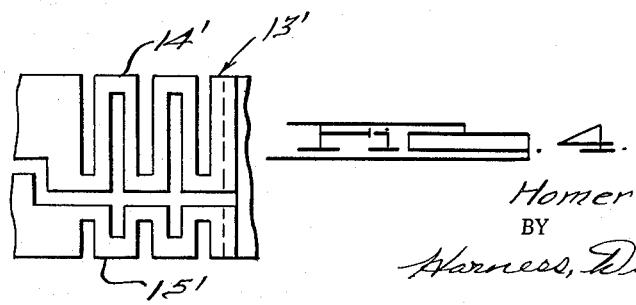
INVENTOR.
Homer F. Malone.
BY
Harness, Dickey & Pierce
ATTORNEYS.

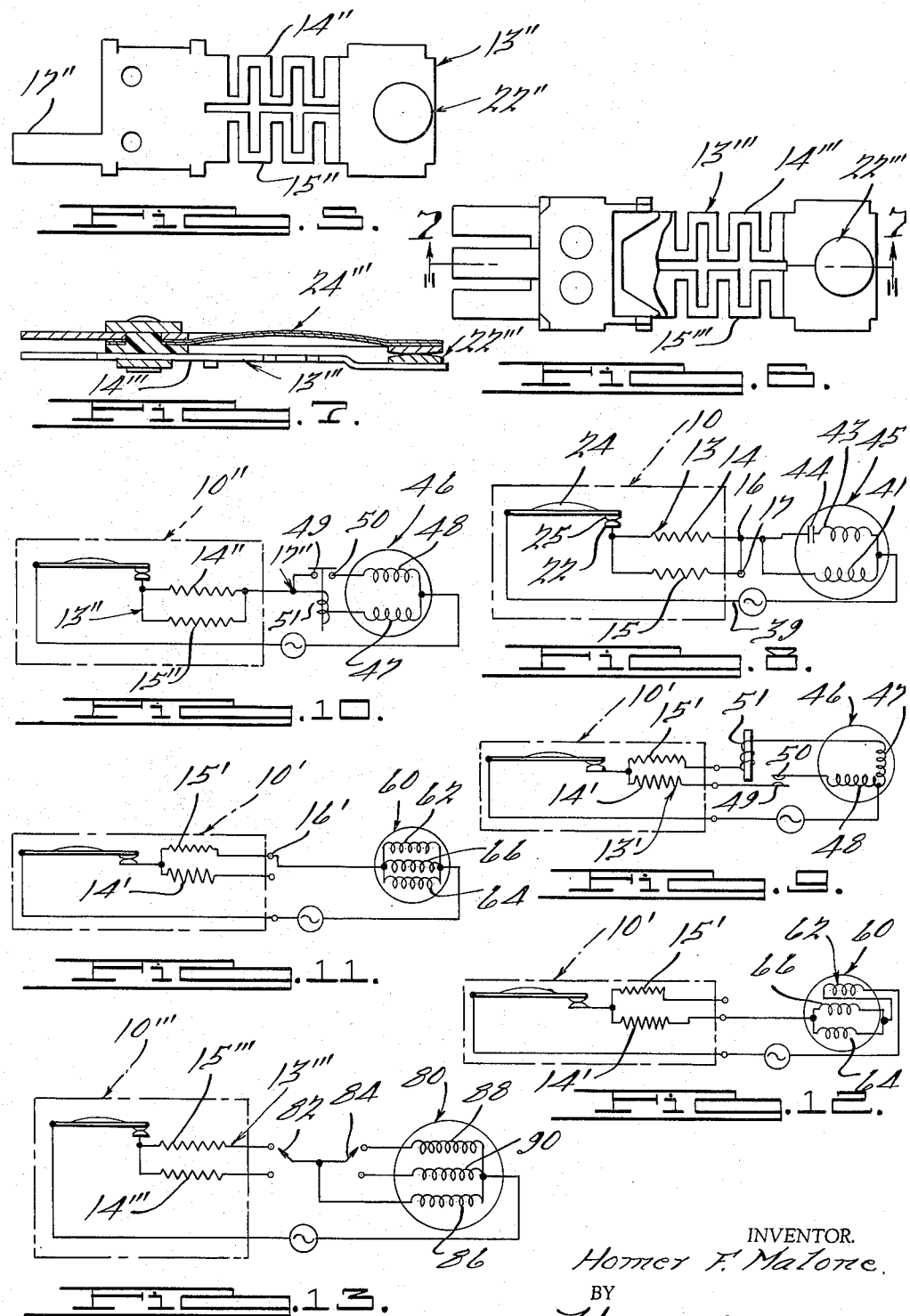

United States Patent Office 3,242,292
Patented Mar. 22, 1966

3,242,292
MOTOR PROTECTOR HAVING SUB-ASSEMBLED
HEATER AND ACTUATOR
Homer F. Malone, Jackson, Mich., assignor, by mesne assignments, to Mechanical Products, Inc., Jackson, Mich., a corporation of Delaware
Filed Apr. 3, 1963, Ser. No. 270,361
3 Claims. (Cl. 200—122)

This invention relates generally to motor protectors and more particularly to an improved heater assembly for a motor protector.

Motor protectors are often mounted on the green motor winding, varnish dipped with the winding, and then enclosed within the end bell or housing of the motor. Thus, such motor protectors are preferably of uniform size so that the motor housing can be standardized.

However, motors of like physical dimension are often designed for specific applications, each of which may have different electrical parameters. Thus, another requisite feature of a motor protector is that its protective response characteristics can be modified to meet specific application requirements.

In motor protectors employing a heater, the response of the protector can be altered to suit the requirements of the application by changing the resistance of the heater as well as the resistivity of the thermometal blade. In previously made protectors it has also been the practice to change the physical size and configuration of the heater as well as its proximity to the motor protector blade. Thus, previously known motor protectors utilizing heaters have required relatively detailed manufacturing controls to maintain the required protector performance. Large inventories and the attendant stocking problems and cost have been further complicated by the difficulty of identification of parts and the consequent increased effort required to avoid manufacturing errors.

One advantage of the motor protector of this invention is its ready adaptability to single or to multiple purpose usage. Such usages encompass protection of motors which are split phase single speed; split phase dual speed; split phase single speed dual voltage; or any other motors of complex or multiple protective or load carrying requirements. Any of these motors can be, and frequently are capacitor split with a magnetic or centrifugal switch in series with the starting winding, so that when the motor reaches a desired speed the starting winding is automatically disconnected from the source of voltage. Any of these motors may have permanently split starting windings in which case a capacitor is, and remains, in series with the starting winding even after the motor reaches full running speed.

Another advantage of the motor protector of the instant invention is that all of the thermal and electrical elements are essentially flat and of like configuration. For example, the heater in the motor protector of the instant invention is always in the same spaced generally parallel relationship to, and always on the same side of the thermometal blade and therefore is in the same radiant, convective, and conductive heat relationship to the blade regardless of whether it be a single or divided heater structure. The heater can be of two or three terminal construction, as necessary, to provide the required scope of protection. The divided heater can also be made in the form in which the two component parts are enantiomorphously dimensionally identical but may have any desired resistance relationship, such as 4:1, and may be joined as by welding a contact across the line of juncture of the two parts. Such a motor protector then becomes a still more versatile tool for the protection of electrical equipment.

Additional advantages accrue as a result of the dimensional uniformity of all of the possible combinations of electrical and thermal elements. For example, the electrical and thermal elements are a self-supporting sub-assembly that can be examined with automatic equipment to determine that it functions correctly, and can be calibrated and adjusted if necessary to bring it in to exact performance requirements.

The motor protector sub-assembly can then be inserted into the open end of an elongated envelope. This envelope is preferably made of thermo-setting plastic which, by reason of certain gaseous emanations in the presence of an electrical arc, has arc quenching properties.

The resulting assembly lends itself to being environmentally sealed, as by an epoxy, so that it is physically secured in position and protected against the penetration of the outside environment into the cavity of the protector housing.

The protector can be secured to an unimpregnated motor winding, as by tying, and the resulting assembly can then be dipped in varnish and thus treated for maximum service life and without impairment of the performance of the subject protector.

By reason of the fact that the thermometal blade is always in the same relationship to the heater it is possible to orient the protector so that the blade is always contiguous, for example, to the motor winding. Thus each motor protector will be in the same heat relationship to the motor windings and, hence will perform similarly.

The heaters, when fabricated and used in the prescribed manner in conjunction with an internally stressed thermometal blade, and when packaged as described, make possible a low cost protector of small size and large load capacity as well as unusually good performance.

Accordingly, one object of the instant invention is an improved motor protector having a heater element whose overall physical dimensions remain constant.

Another object of the invention is to make a motor protector heater element having a constant overall dimension but made of materials having a wide range of resistivities.

Another object of the invention is to make a motor protector heater element having a constant overall dimension but which is divided into two resistance legs.

Another object of the invention is to make a motor protector heater element of constant overall dimensions but which is divided into two legs of unequal length of serpentine configuration and of various resistance materials.

Another object of the invention is to make a composite motor protector heating element having constant overall dimensions but being made of two dimensionally identical legs of unequal resistivity materials and joined by a contact as by welding.

Another object of the invention is a motor protector in which the ratio of ambient thermal effect to $I^2R$ effect can be varied over a wide range, selectively.

Another object of the invention is a motor protector wherein the thermal and electrical elements comprise a sub-assembly that can be built and tested independently of its final enclosure.

Another object of the invention is a motor protector utilizing an improved heater comprising a sheet metal stamping.

Other objects and advantages of the instant invention will become apparent from the following description, claims and drawings wherein:

FIGURE 1 is a top plan view, partially broken away, of a motor protector in accordance with an exemplary constructed embodiment of the instant invention;

FIG. 2 is a cross sectional view taken substantially along the line 2—2 of FIGURE 1;

FIG. 3 is a top plan view of the heater and contact assembly;

FIG. 4 is a fragmentary view of a modified heater illustrating legs of different resistance;

FIG. 5 is a top plan view of a modified heater and contact assembly;

FIG. 6 is a top plan view, partially broken away, of a motor protector blade and heater assembly ready to be tested and before insertion into an enclosure;

FIG. 7 is a cross sectional view taken substantially along the line 7—7 of FIG. 6;

FIG. 8 is a wiring diagram of one embodiment of the motor protector in operative association with an electric motor;

FIG. 9 is a wiring diagram of another embodiment of the motor protector in operative association with an electric motor;

FIG. 10 is a wiring diagram of the motor protector connected in yet another environment;

FIG. 11 is a wiring diagram of the motor protector connected in still another environment;

FIG. 12 is a wiring diagram of the motor protector connected in yet another environment; and FIG. 13 is a wiring diagram of the motor protector connected in yet another environment.

As best seen in FIGURES 1 and 2 of the drawings, a motor protector 10, in accordance with an exemplary constructed embodiment of the instant invention, comprises an insulating envelope or enclosure 11 that is of generally tubular construction and has an open end 12 for the acceptance of the electrically energized components thereof.

In accordance with one aspect of the instant invention, the electrically energized components of the motor protector 10 are supported by a heater element 13 having a pair of legs 14 and 15 of generally serpentine configuration. The leg portions 14 and 15 of the heater element 13 have terminals 16 and 17 thereon, respectively, that extend outwardly of the enclosure 11 to facilitate connection of the motor protector 10 in an electrical circuit. The heater element 13 has a pair of apertures 18 and 19 (FIG. 3) therein for the acceptance of a pair of rivets 20 and 21, respectively, which retain the electrically energized components of the motor protector 10 in the assembled condition, as will be described.

As best seen in FIGURES 2 and 3 of the drawings, a fixed contact 22 is electrically connected to an inner end portion 23 of the heater element 13. It is to be noted that the legs 14 and 15 of the heater element 13 are electrically connected to one another at the inner end portion 23 thereof so that the fixed contact 22 is, in effect, connected in series between the legs 14 and 15. Thus, it should be apparent that the legs 14 and 15 can be connected in parallel by connecting the terminals 16 and 17 to one another and to an external conductor. Alternatively, either the leg 14 or the leg 15 can be used singly by connecting only the terminal 16 or 17, respectively, in an electrical circuit. Other alternatives are to connect the legs 14 and 15 in series or to different windings of a motor, as will be discussed.

As best seen in FIG. 4 of the drawings, another means for changing the electrical characteristics of a heater 13 and thus, of the motor protector 10, is by increasing the transverse lengths of the convolutions on one of the legs 14′ and shortening the convolutions on the other of the legs 15′. Thus, it will be seen that a variation in resistance is achieved between the legs 14′ and 15′ of the heater 13′ which can be utilized to satisfy the electrical requirements of a specific application while the overall dimension of the heater 13′ are the same as the heater 13.

Referring again to FIG. 2, a snap-acting bimetallic blade 24 is mounted directly above the heater 13 in generally parallel heat transfer relationship thereto. The blade 24 has a movable contact 25 affixed to a free end portion 26 thereof, the contact 25 being aligned and engageable with the fixed contact 22 so as to normally complete an electric circuit through the motor protector 10. The blade 24 has an aperture 28 in a fixed end 29 thereof for the acceptance of a boss 30 on an insulating spacer 31.

The bimetallic blade 24 normally maintains the contact 25 thereon in engagement with the fixed contact 22, but is responsive to a temperature increase due to increased I²R losses in the heater 13 to bias the contact 25 to the open condition relative to the contact 22.

As best seen in FIGURE 1 of the drawings, a generally fork-shaped blade control member 35 overlies the bimetallic snap-acting blade 24 in electrical and mechanical engagement therewith. End portions 36 and 37 of the control member 35 extend to close proximate relationship to the edge of a nondevelopable or dished surface 38 on the bimetallic blade 24 to control the snap action of the blade 24. A terminal portion 39 of the control member 35 extends outwardly from the enclosure 12 in generally parallel spaced relation to the terminals 16 and 17 of the motor protector 10 to facilitate connection of the motor protector 10 in an electrical circuit. The control member 35 also has an aperture 40 therein for the acceptance of the boss 30 on the insulating member 31 which precludes relative movement between the aforementioned electrically energized components.

It is to be noted that the heater element 13, bimetallic blade 24, insulating spacer 31 and control member 35 are retained in the assembled condition by the rivets 20 and 21, the entire sub-assembly being insertable into the open end portion 12 of the enclosure 11, whereupon the end portion 12 is sealed as by an epoxy resin.

As seen in FIG. 5 of the drawings, a modified heater 13″ comprises leg portions 14″ and 15″ and a single terminal 17″. This heater has particular utility in the motor circuit of FIG. 8 and of FIG. 10, as will be described.

As seen in FIGS. 6 and 7, a heater 13‴ has legs 14‴ and 15‴, of different material, that are electrically and mechanically joined by a contact 22‴ that is welded thereacross. Because the configuration of the legs 14‴ and 15‴ is similar to the legs 14 and 15, a motor protector utilizing them will be of the same size as the protector 10. However, the use of different materials in the legs 14‴ and 15‴ permits widely varying characteristics.

As seen in FIG. 8 of the drawings, the terminals 16 and 17 of the motor protector 10 are connected to one another and to a main winding 41 of an electric motor 45. The terminals 16 and 17 are also connected to a phase winding 43, through a capacitor 44. Opposite ends of the main and phase windings 41 and 43, respectively, are connected to one side of a source of electrical energy, the other side of which is connected to the terminal 39 of the motor protector 10.

Upon the occurrence of an overload on the motor 45 either during starting or during normal operation, I²R losses in the heater 13 and blade 24 are sufficient to induce snap-action of the blade 24, which carries the movable contact 25 thereon out of engagement with the fixed contact 22. Upon cooling, the blade 24 snaps to the closed condition thereby automatically conditioning the motor 45 for restart. It is to be understood that motor 45 is a perma-split capacitor start and run. Otherwise it shall be assumed that the start winding will be disconnected, automatically, by centrifugal or other switching means when the motor has reached a predetermined speed.

Referring to FIG. 9, a motor protector 10′ is shown in operative association with an electric motor 46 having a run winding 47 and a start winding 48. A pair of normally open relay contacts 49 and 50 are connected in series with the start winding 48. A relay coil 51 is connected in series with the run winding 47. Inrush current in the run winding 47 of the rotor energizes the coil 51 sufficiently to effect closure of the contacts 49 and 50, thereby to energize the start winding 48. When current in the run winding 47 decreases to normal operating current the relay coil 51 is deenergized sufficiently to permit opening of the relay contacts 49 and 50, taking the start winding 48 out of the motor circuit.

This is an example of a two heater multi-purpose motor protector 10' capable of totally protecting the motor 46. The heater 14' is in series with the start winding 48 and the heater 15' is in series with the main winding 47. The heater 14' in the start winding 48 circuit is of such resistance that it will not permit the winding 48 to remain in circuit for a period of time sufficient to damage the motor 46. The ratio of resistances of legs 14' and 15' of the heater element 13' shown in FIG. 9 is, for example, 2 to 1. It is to be noted that the resistance ratio can be varied as required by merely changing the length of the serpentine portion of the legs 14' and 15' of the heater element 13'. This illustrates the advantage of a divided heater, either leg of which can be suited to application requirements.

Referring to FIG. 10, the motor 46 is protected by the motor protector 10" as opposed to the protector 10'. In this instance the legs 14" and 15" of the heater 13" are connected to the single terminal 17" to satisfy a particular application requirement. Motor operation is the same, namely, closure of the relay contacts 49 and 50 due to inrush current in the run winding 47 effects energization of the start winding 48. When the current in the run winding 47 decreases to normal operating current the relay coil 51 is deenergized sufficiently to permit opening of the relay contacts 49 and 50, taking the start winding 48 out of the motor circuit.

With reference to FIGS. 11 and 12, it is generally considered that a motor maufacturer will connect, internally, both his motor windings and the protector for either 115 volt or for 230 volt operation, for example, as the manufacturer of the motor driven appliance has specified. If the appliance manufacturer wishes to make the voltage selection optional with the appliance user, the internal connections of the motor and of the protector have to be brought to an external, manual, or automatic, switching board. It is also known, for dual voltage motors, that both main windings and the start winding are in parallel for 115 volt operation. If 230 volt operation is desired, the start winding remains in parallel with one of the two main winding coils. The other of the two main windings is connected in series with the aforementioned parallel combination. By reason of this selective arrangement it is possible to use either a magnetic or a centrifugal switch in the start winding circuit and it is to be assumed that some such switch will be utilized in the two above designated arrangements.

As shown in FIGS. 11 and 12 of the drawings, a motor 60 is connectible for 115 or 230 volt operation, selectively. The motor protector 10' is particularly well suited for this application.

As shown in FIG. 11 the motor 60 is connected for operation at 115 volts. The motor 60 comprises 115 volt main windings 62 and 64 and a start winding S66, a disconnect means therefor not being shown. The start winding 66 parallels the run windings R62 and R64 all of which are connected to the terminal 16' of the motor protector 10'.

Referring to FIG. 12, when the motor 60 is connected for 230 volt operation, the run winding 62 thereof is series connected with the run winding 64. Because the reactance of the 230 volt connection is approximately four times that of the 115 volt connection the resistance of the heater 14' is required to be approximately four times the resistance of the heater 15'. Thus, the single motor protector 10' can be utilized to protect the motor 60 at both of its operating voltages.

Frequently it is desirable for the program timer of, for example, an automatic washing machine to switch a two-speed motor of the machine from 6-pole to 4-pole operation when operating, for example, the spin dryer of the machine.

As best seen in FIG. 13 a motor protector 10''' having the heater 13''' discussed hereinbefore is shown in operative association with a two-speed electric motor 80. The motor 80 has, for example, centrifugal double throw switches 82 and 84. The motor 80 has a start winding 86, a 4-pole run winding 88 and a 6-pole run winding 90. As shown, the run winding 88 is energized through the leg 15''' of the heater element 13'''. When the motor is switched to the 6-pole run winding 90 the leg 14''' of the heater element 13''' is energized. Thus, both the 4 and 6 pole main windings 86 and 88, respectively, can be properly protected. Since the protector is, of necessity, permanently mounted either on the 4 pole, 6 pole, or start winding, and, since the requirements of the application are severely restrictive, it is of the utmost importance that the protector, 10''', have a broad range of resistance selectivity in either leg 15''' or leg 14'''. Only if such selectivity is possible can identical protection for each speed selection be possible. It is to be recognized that either a magnetic or centrifugal switch can be used to effect disconnect of the start winding.

From the foregoing description it should be apparent that a motor protector in accordance with the instant invention features a heater having single or multiple elements whose overall physical dimensions remain constant. (The elements of the heater can be of like material but of different resistance which is achieved by varying the serpentine length thereof.) Alternatively, the legs can be made of different material thereby producing a still wider variation in resistance.

The heater element positions and supports a fixed electrical contact in constant spaced relationship to a snapacting blade. Thus, the heat transfer relationships within the motor protector are known, variations in electrical characteristics being a function solely of heater characteristics.

Further, the electrically energized components of the motor protector can be assembled as a sub-assembly, tested independently of an enclosure, and then inserted into an enclosure and sealed.

It is also to be noted that the motor protector utilizes heaters made from sheet metal stampings which are relatively easily fabricated and lend themselves to precise quality control.

From the foregoing description it should be apparent that the motor protector of the instant invention sets a new standard in the art.

It is to be understood that the specific construction of the improved motor protector herein disclosed and described is presented for the purpose of explanation and illustration and is not intended to indicate limits of the invention, the scope of which is defined by the following claims.

What is claimed is:

1. In a motor protector comprising a tube like enclosure with one open end, an improved electrical sub-assembly comprising, a generally flat heater having a pair of legs of serpentine configuration joined to one another at one end and having terminals at the other end, respectively, a fixed contact on and supported solely by said heater at the juncture of the legs thereof, a bimetallic blade having one end mechanically insulatedly supported by said heater in electrically spaced relation but in close generally parallel heat transfer relationship therewith, said blade having a terminal at said one end, and, a movable contact supported by said blade at the other end thereof engageable with said fixed contact to complete an electrical circuit between the terminal on said blade and the terminals on said legs, said electrical sub-assembly being insertable into said enclosure through the open end thereof with said terminals extending outwardly for connection in an electrical circuit.

2. In a motor protector comprising a tube like enclosure with one open end, an improved electrical sub-assembly comprising, a generally flat heater of serpentine configuration having a terminal at the one end, a fixed contact on and supported solely by said heater at the other end thereof, a bimetallic blade having one end mechanically insulatedly supported by said heater in electrically spaced relation but in close generally parallel heat transfer relationship therewith, said blade having a terminal at said one end, and, a movable contact supported by said blade at the other end thereof engageable with the fixed contact on said heater to complete an electrical circuit between the terminal on said blade and the terminal on said heater, said electrical sub-assembly being insertable into said enclosure through the open end thereof with said terminals extending outwardly for connection in an electrical circuit.

3. A motor protector comprising, a bimetallic blade having a terminal at one end, a substantially flat heater having a pair of elongated legs of serpentine configuration and of different resistivity, selectively, the legs of said heater lying in the same plane so as to have substantially the same heat transfer relationship with said blade and being joined to one another at one end and having terminals at the other end, respectively, the other end of said heater mechanically insulatedly supporting said one end of said blade in electrically spaced relationship, a fixed contact on and supported solely by said heater at the juncture of the legs thereof, and a movable contact supported by said blade at the other end thereof engageable with said fixed contact to complete an electrical circuit between the terminal on said blade and the terminals on said legs.

References Cited by the Examiner

UNITED STATES PATENTS

| | | | |
|---|---|---|---|
| 1,402,417 | 1/1922 | Hamilton | 200—113 |
| 2,312,915 | 3/1943 | Kurz | 175—294 |
| 2,347,014 | 4/1944 | Willmann | 60—23 |
| 2,840,666 | 6/1958 | Greenhut | 200—122 |
| 3,004,203 | 10/1961 | Epstein | 318—221 |
| 3,031,551 | 4/1962 | White et al. | 200—122 |

BERNARD A. GILHEANY, *Primary Examiner.*

ROBERT K. SCHAEFER, *Examiner.*